United States Patent
Han et al.

(10) Patent No.: US 11,678,239 B2
(45) Date of Patent: *Jun. 13, 2023

(54) COMMUNICATION METHOD, BASE STATION, AND TERMINAL

(71) Applicant: Huawei Technologies Co., Ltd., Shenzhen (CN)

(72) Inventors: Feng Han, Shanghai (CN); Hong Li, Shanghai (CN); Yinghao Jin, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

This patent is subject to a terminal disclaimer.

(21) Appl. No.: 17/403,510

(22) Filed: Aug. 16, 2021

(65) Prior Publication Data

US 2022/0038977 A1 Feb. 3, 2022

Related U.S. Application Data

(63) Continuation of application No. 16/370,060, filed on Mar. 29, 2019, now Pat. No. 11,096,105, which is a (Continued)

(30) Foreign Application Priority Data

Sep. 30, 2016 (CN) .......................... 201610877936.1

(51) Int. Cl.
 *H04W 36/08* (2009.01)
 *H04W 76/27* (2018.01)
 (Continued)

(52) U.S. Cl.
 CPC ........... *H04W 36/08* (2013.01); *H04L 1/1819* (2013.01); *H04W 8/245* (2013.01);
 (Continued)

(58) Field of Classification Search
 CPC . H04W 36/08; H04W 8/245; H04W 36/0069; H04W 48/20; H04W 72/0453;
 (Continued)

(56) References Cited

U.S. PATENT DOCUMENTS

2011/0235514 A1 9/2011 Huang et al.
2013/0010620 A1 1/2013 Dinan
(Continued)

FOREIGN PATENT DOCUMENTS

CN 101742591 A 6/2010
CN 102223657 A 10/2011
(Continued)

OTHER PUBLICATIONS

"QoS Control in LAA UL Operation," 3GPP TSG-RAN WG2 Meeting #89bis, Bratislava, Slovakia, R2-151176, XP050953247, pp. 1-4, 3rd Generation Partnership Project, Valbonne, France (Apr. 20-24, 2015).

(Continued)

*Primary Examiner* — Tejis Daya
(74) *Attorney, Agent, or Firm* — Leydig, Voit & Mayer, Ltd.

(57) ABSTRACT

Embodiments of the present invention propose a communication method. The communication method includes: obtaining, by a base station, DRB configuration information, where the DRB configuration information is used to determine a mapping relationship between serving cells and DRBs used to carry data of different service types; and sending the DRB configuration information to a terminal, so that the terminal communicates with the base station in a serving cell corresponding to a DRB. The embodiments of the present invention further disclose a base station and a terminal to which the communication method is applied.

21 Claims, 7 Drawing Sheets

Related U.S. Application Data continuation of application No. PCT/CN2017/099451, filed on Aug. 29, 2017.

(51) Int. Cl.
| | |
|---|---|
| *H04W 76/11* | (2018.01) |
| *H04L 1/1812* | (2023.01) |
| *H04W 72/0453* | (2023.01) |
| *H04W 48/20* | (2009.01) |
| *H04W 8/24* | (2009.01) |
| *H04W 36/00* | (2009.01) |
| *H04W 76/28* | (2018.01) |
| *H04L 5/00* | (2006.01) |
| *H04W 76/15* | (2018.01) |

(52) U.S. Cl.
CPC ....... *H04W 36/0069* (2018.08); *H04W 48/20* (2013.01); *H04W 72/0453* (2013.01); *H04W 76/11* (2018.02); *H04W 76/27* (2018.02); *H04L 5/001* (2013.01); *H04L 5/0007* (2013.01); *H04W 76/15* (2018.02); *H04W 76/28* (2018.02)

(58) Field of Classification Search
CPC ..... H04W 76/11; H04W 76/27; H04W 76/15; H04W 76/28; H04W 36/14; H04W 72/12; H04L 1/1819; H04L 5/0007; H04L 5/001; H04L 5/0064; H04L 5/0044; H04L 5/0091

See application file for complete search history.

(56) References Cited

U.S. PATENT DOCUMENTS

| | | | |
|---|---|---|---|
| 2013/0148607 | A1 | 6/2013 | Yu et al. |
| 2015/0071059 | A1 | 3/2015 | Fu et al. |
| 2015/0188650 | A1 | 7/2015 | Au et al. |
| 2016/0205664 | A1 | 7/2016 | Zhang et al. |
| 2016/0212661 | A1 | 7/2016 | Basu Mallick et al. |
| 2017/0339568 | A1 | 11/2017 | Wang et al. |
| 2017/0353972 | A1 | 12/2017 | Babaei et al. |
| 2018/0041936 | A1 | 2/2018 | Kim et al. |
| 2018/0062819 | A1 | 3/2018 | Horn et al. |
| 2018/0083688 | A1 | 3/2018 | Agiwal et al. |
| 2018/0249513 | A1 | 8/2018 | Chang et al. |
| 2018/0270894 | A1* | 9/2018 | Park .............. H04W 76/14 |
| 2018/0279358 | A1* | 9/2018 | Babaei ............ H04W 72/0453 |
| 2018/0352468 | A1 | 12/2018 | Futaki et al. |
| 2019/0174513 | A1* | 6/2019 | Loehr ............. H04W 72/23 |
| 2019/0174554 | A1 | 6/2019 | Deenoo et al. |

FOREIGN PATENT DOCUMENTS

| | | |
|---|---|---|
| CN | 102612095 A | 7/2012 |
| CN | 103262642 A | 8/2013 |
| CN | 104363598 A | 2/2015 |
| CN | 104797007 A | 7/2015 |
| CN | 105379351 A | 3/2016 |
| CN | 105917727 A | 8/2016 |
| CN | 108430077 A | 8/2018 |
| EP | 2816853 A1 | 12/2014 |
| WO | 2005067181 A1 | 7/2005 |
| WO | 2014205678 A1 | 12/2014 |
| WO | 2015076925 A1 | 5/2015 |
| WO | 2015115034 A1 | 8/2015 |

OTHER PUBLICATIONS

"E-MBMS Channelisation and Procedures," 3GPP TSG-RAN WG2 Meeting #48bis, Cannes, France, R2-052525, XP050129628, pp. 1-8, 3rd Generation Partnership Project, Valbonne, France (Oct. 10-14, 2005).

U.S. Appl. No. 16/370,060, filed Mar. 29, 2019.

"E-MBMS Channelisation And Procedures," 3GPP TSG-RAN WG2 meeting #48bis, R2-052525, Cannes, France, pp. 1-8, 3rd Generation Partnership Project, Valbonne, France (Oct. 10-14, 2005).

"QoS Control in LAA UL Operation," 3GPP TSG-RAN WG2 Meeting #89bis, R2-151176, Bratislava, Slovakia, Total 4 pages, 3rd Generation Partnership Project, Valbonne, France (Apr. 20-24, 2015).

Samsung, "Multiple access for different vertical services in 5G new radio interface," 3GPP TSG RAN WG1 Meeting #84bis, Busan, Korea, R1-162178, total 4 pages, 3rd Generation Partnership Project, Valbonne, France (Apr. 11-15, 2016).

\* cited by examiner

COMMUNICATION METHOD, BASE STATION, AND TERMINAL

CROSS-REFERENCE TO RELATED APPLICATIONS

This application is a continuation of U.S. patent application Ser. No. 16/370,060, filed on Mar. 29, 2019, (Now U.S. Pat. No. 11,096,105), which is a continuation of International Application No. PCT/CN2017/099451, filed on Aug. 29, 2017, which claims priority to Chinese Patent Application No. 201610877936.1, filed on Sep. 30, 2016. All of the afore-mentioned patent applications are hereby incorporated by reference in their entireties.

TECHNICAL FIELD

The present invention relates to the field of communications technologies, and in particular to a communication method.

BACKGROUND

As next generation communications system research is started and deepened, requirements of the industry for 5G are increasingly clear. 5G supports more types of network deployments and applications, including higher data rate experience and a wider bandwidth access capability such as an enhanced mobile broadband, enhanced Mobile Broadband (eMBB) service; lower latency and higher reliable information exchange such as a ultra-reliable and low latency communication, ultra-reliable and low latency communication (URLLC) service; and larger-scale and lower-cost machine type communication (MTC) device access and management such as massive machine type communication (mMTC) service. Different service types are carried by using different data radio bearers (DRBs).

To satisfy the foregoing requirements, a next generation radio (NR) supports a plurality of numerologies at a same carrier. For example, the URLLC may be based on a short transmission time interval (TTI), the eMBB is based on a long TTI, and an evolved Multimedia Broadcast/Multicast Service (eMBMS) is based on a long cyclic prefix (CP). It is difficult for a current system architecture to satisfy specific service attribute requirements.

SUMMARY

Embodiments of the present invention disclose a communication method and a corresponding base station and terminal, to better support transmission of data of different service types in NR.

According to a first aspect, an embodiment of the present invention proposes a communication method, including:

obtaining, by a base station, DRB configuration information, where the DRB configuration information is used to determine a mapping relationship between serving cells and DRBs used to carry data of different service types; and sending the DRB configuration information to a terminal, so that the terminal communicates with the base station in a serving cell corresponding to a DRB.

In a possible design, each serving cell supports one or more numerologies, and the DRB configuration information is further used to configure a mapping relationship between a DRB and the one or more numerologies supported by each serving cell.

In a possible design, the DRB configuration information further includes a serving cell priority or a numerology priority, so that the terminal selects, based on the serving cell priority, a serving cell with a higher priority for communication, or selects, based on the numerology priority, a numerology with a higher priority for communication.

In a possible design, the terminal is connected to a primary serving cell and at least one secondary serving cell, and the communication method further includes:

sending radio resource control (RRC) connection reconfiguration signaling to the terminal, where the RRC connection reconfiguration signaling includes a secondary serving cell ID and the DRB configuration information, so that the terminal performs communication in a secondary serving cell identified by the secondary serving cell ID.

In a possible design, the communication method further includes:

sending a handover request to another base station;

receiving a handover response from the another base station, where the handover response includes DRB configuration information of the another base station and one or more serving cell IDs of the another base station; and sending RRC connection reconfiguration signaling to the terminal in response to the handover response, where the RRC connection reconfiguration signaling includes the DRB configuration information and one or more serving cell IDs of the another base station, so that the terminal performs communication based on the RRC connection reconfiguration signaling in a serving cell corresponding to the one or more serving cell IDs of the another base station.

In a possible design, the RRC connection reconfiguration signaling further includes a retaining indication, and the retaining indication is used to instruct the terminal to retain a connection to a secondary serving cell of a current base station.

According to a second aspect, another embodiment of the present invention further discloses a communication method, including:

receiving, by a terminal, DRB configuration information from a base station, where the DRB configuration information is used to determine a mapping relationship between serving cells and DRBs used to carry data of different service types; and communicating with the base station in a serving cell corresponding to a DRB in response to the DRB configuration information.

In a possible design, each serving cell supports one or more numerologies, and the DRB configuration information is further used to configure a mapping relationship between a DRB and the one or more numerologies supported by each serving cell.

In a possible design, the DRB configuration information further includes a serving cell priority or a numerology priority, so that the terminal selects, based on the serving cell priority, a serving cell with a higher priority for communication, or selects, based on the numerology priority, a numerology with a higher priority for communication.

In a possible design, the terminal is connected to a primary serving cell and at least one secondary serving cell, and the communication method further includes:

receiving, by the terminal, RRC connection reconfiguration signaling from the base station, where the RRC connection reconfiguration signaling includes a secondary serving cell ID and the DRB configuration information; and performing communication in a secondary serving cell corresponding to the secondary serving cell ID in response to the RRC connection reconfiguration signaling.

In a possible design, the method further includes: receiving, by the terminal, RRC connection reconfiguration signaling from the base station, where the RRC connection reconfiguration signaling includes DRB configuration information and one or more serving cell IDs of another base station, so that the terminal performs communication based on the RRC connection reconfiguration signaling in a serving cell corresponding to the one or more serving cell IDs of the another base station.

In a possible design, the RRC connection reconfiguration signaling further includes a retaining indication, and the retaining indication is used to instruct the terminal to retain a connection to a secondary serving cell of a current base station.

According to a third aspect, an embodiment of the present invention further discloses a base station. The base station further includes units configured to perform the communication method disclosed in the first aspect of the embodiments of the present invention.

According to a fourth aspect, a base station is provided. The base station includes a transceiver, a memory, and a processor. The transceiver, the memory, and the processor are connected through a system bus. The memory is configured to store an instruction, and the processor is configured to execute the instruction stored by the memory. When the instruction is executed, the processor is configured to perform the foregoing communication method that is based on a base station.

According to a fifth aspect, an embodiment of the present invention further discloses a terminal. The terminal further includes units configured to perform the communication method disclosed in the second aspect of the embodiments of the present invention.

According to a sixth aspect, a terminal is provided. The terminal includes a transceiver, a memory, and a processor. The transceiver, the memory, and the processor are connected through a system bus. The memory is configured to store an instruction, and the processor is configured to execute the instruction stored by the memory. When the program is executed, the processor is configured to perform the foregoing communication method that is based on a terminal.

According to the communication method proposed in the embodiments of the present invention, types of services transmitted on the DRBs are considered, a transmission requirement for a service flow is satisfied, and scheduling flexibility is implemented, so that more data can be transmitted when there are surplus uplink UL resources.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a wireless local area network (WLAN), or a future 5th generation (5G) wireless communications system.

It should be further understood that, in the embodiments of the present invention, a terminal device may be referred to as user equipment (UE), a mobile station (MS), a mobile terminal, or the like. The terminal device may communicate with one or more core networks via a radio access network (rRAN). For example, the terminal device may be a mobile phone (also referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

In the embodiments of the present invention, a base station may be a base transceiver station (BTS) in GSM or CDMA, or may be a NodeB (NB) in WCDMA, or may be an evolved NodeB (eNB) in LTE, which is not limited in the present invention. However, for ease of description, the following embodiments are described by using the eNB as an example.

A communications system includes a base station and one or more terminal devices. The one or more terminal devices fall within a coverage area of one or more carriers (which may be understood as cells) provided by the base station. When there are a plurality of carriers serving the terminal device, the terminal device may work in a carrier aggregation (CA) manner.

Figure 1:
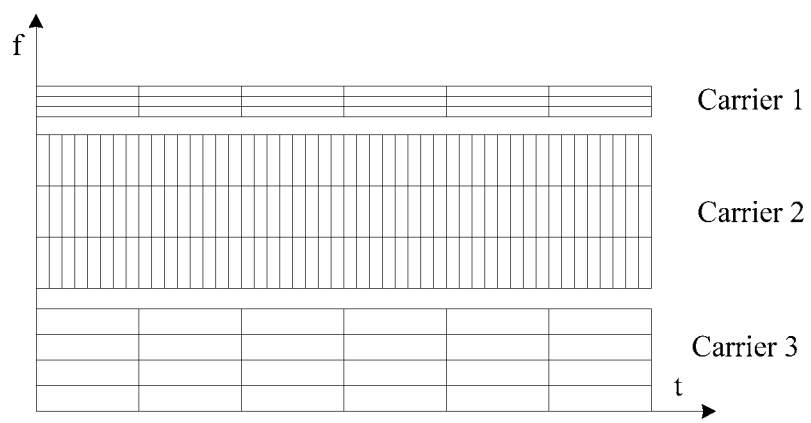
FIG. 1 is a schematic diagram of a first carrier configuration manner according to an embodiment of the present invention.
Figure 2:
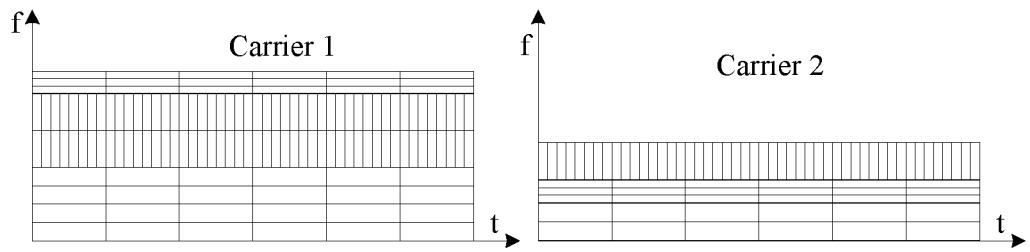
FIG. 2 is a schematic diagram of a second carrier configuration manner according to an embodiment of the present invention.

The carrier aggregation has two configuration manners. FIG. 1 and FIG. 2 respectively show two configuration manners in the embodiments of the present invention.

In a first configuration manner, different carriers use different numerologies, and each carrier supports one numerology. Each numerology corresponds to a different subcarrier spacing, subframe length, TTI length, multiple access manner, CP, reference signal, control channel, and the like. As shown in FIG. 1, a carrier 1 uses a numerology supporting an mMTC service, a carrier 2 uses a numerology supporting a URLLC service, and a carrier 3 uses a numerology supporting an eMBB service. Because a carrier having a specific numerology is more suitable for transmission of a specific type of service, different carriers may be respectively applicable to different types of services due to different numerologies of different carriers. For example, the URLLC service is more suitable for transmission at a carrier having a short subframe.

In a second configuration manner, as shown in FIG. 2, different carriers use different numerologies, each carrier may support a plurality of numerologies, and the carriers each support a plurality of different numerologies. The plurality of different numerologies mean different time-frequency resource locations, or mean support for different numerologies. For example, a carrier 1 supports a numerology 1 and a numerology 2, and a carrier 2 supports a numerology 2 and a numerology 3.

Figure 3:
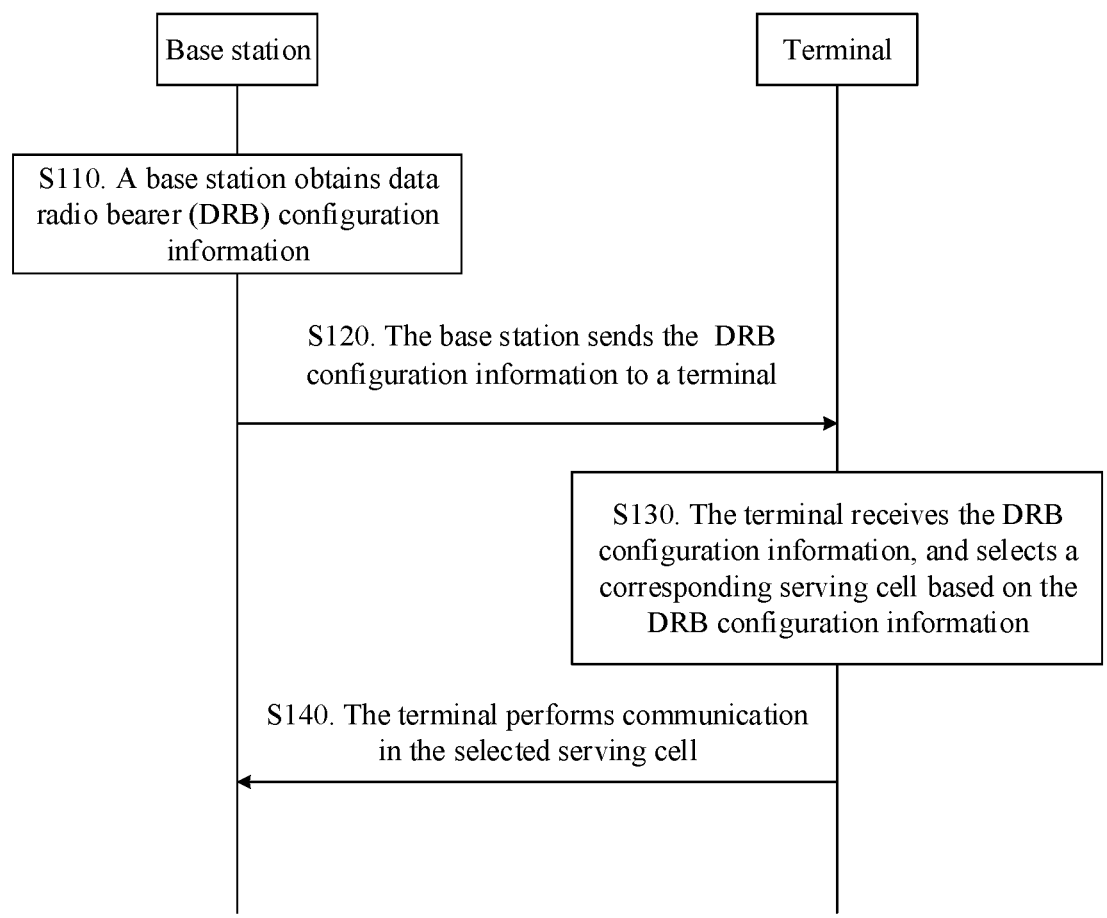
FIG. 3 is a schematic diagram of a communication method according to an embodiment of the present invention.

FIG. 3 shows a communication method according to an embodiment of the present invention. The method is performed by a base station and one or more terminals (only one terminal is shown in the figure). The communication method specifically includes the following steps.

S110. The base station obtains DRB configuration information, where the DRB configuration information is used to determine a mapping relationship between DRBs for carrying data of different service types and serving cells. One serving cell uses one carrier for data communication. The carrier herein may also be referred to as a component carrier (CC). Each carrier serves an independent cell having an independent cell ID.

In this embodiment, data of different service types may be transmitted by using different DRBs, and the base station configures a corresponding serving cell for each DRB for communication. The different service types may include an eMBB service, a URLLC service, an mMTC service, and the like. Specifically, one DRB may correspond to one serving cell, and a service carried by the DRB is transmitted in the serving cell corresponding to the DRB. Alternatively, one DRB may correspond to a plurality of serving cells, and a service carried by the DRB is transmitted in the plurality of serving cells corresponding to the DRB. However, for one serving cell, the serving cell may correspond to one or more DRBs. In other words, one serving cell may transmit data of one or more services. Optionally, in an embodiment, the DRB configuration information is specifically as follows:

| | | |
|---|---|---|
| drip-Identity | DRB-Identity, | |
| logicalChannelIdentity | INTEGER (3..10) | |
| sCellIndex | SCellIndex, | //serving cell ID |
| numerologyIndex | numerologyIndex | //numerology ID |

"sCellIndex" is used to represent a serving cell ID, "numerologyIndex" is used to represent a numerology ID, "logicalChannelIdentity" is a logical channel identifier and is used to indicate a logical channel corresponding to the DRB, and "drb-Identity" is a DRB identifier and corresponds to a DRB indicated by "drb-Identity". A terminal performs communication in a serving cell indicated by "sCellIndex" and on a numerology indicated by "numerologyIndex" that are in the DRB configuration information.

As previously described, because data of different service types have different requirements for transmission performance, when DRB transmission is carried in a serving cell that better satisfies a requirement for service transmission performance, a specific service attribute requirement can be satisfied.

In another embodiment, when each serving cell further supports a plurality of numerologies, the DRB configuration information is further used to configure a mapping relationship between a DRB and a numerology supported by the serving cell. Specifically, the DRB configuration information may be used to configure a mapping relationship between a DRB and one or more numerologies in a serving cell. One DRB may use one numerology or a plurality of different numerologies supported by a serving cell for transmission, or may use one numerology or more different numerologies supported by different serving cells for transmission. In conclusion, one DRB may use one or more numerologies for transmission. Optionally, the base station configures the terminal by using the DRB configuration information, so that the terminal can perform communication on a same numerology in different serving cells. For one numerology, one type of numerology may correspond to one or more DRBs. In other words, one type of numerology may be used to transmit data of one or more service types.

Numerologies have at least different sub-carrier spacing, subframe lengths, and multiple access manners, or may further have different channel coding manners, control channels, reference signals, CP lengths, and the like. For example, a subcarrier spacing of a numerology is 15 kHz, and a subcarrier spacing of another numerology is 30 kHz.

Optionally, the DRB configuration information further includes either numerology priority information or serving cell priority information or both, so that the terminal performs communication based on a numerology indicated by the numerology priority and/or based on a serving cell indicated by the serving cell priority. Specifically, because one DRB may correspond to a plurality of serving cells for communication, one or more serving cells need to be selected from the corresponding plurality of serving cells. When the DRB configuration information includes priority information of each serving cell, the base station selects one from a plurality of serving cells based on the serving cell priority to carry corresponding DRB data. In addition, one DRB may use a plurality of numerologies for communication, and one or more numerologies need to be selected from the corresponding plurality of numerologies. When the DRB configuration information includes a numerology priority of each numerology, the base station selects one or more from a plurality of numerologies based on the numerology priority to perform corresponding DRB data communication. If the DRB configuration information includes a priority of each serving cell and a priority of each numerology, an order used for both priorities is not limited. The base station may first select a serving cell with a higher priority based on priorities of a plurality of serving cells, and then select a numerology with a higher priority based on the numerology priority. Alternatively, the base station may first select a numerology with a higher priority based on the numerology priority, and then select a serving cell with a higher priority based on priorities of a plurality of serving cells.

For example, when the foregoing first configuration manner is used for carrier aggregation, that is, when each carrier supports one numerology, the base station may configure the terminal to select one serving cell based on the serving cell priority, and carry DRB data in the selected serving cell.

For example, when the foregoing second configuration manner is used for serving cell aggregation, that is, when each serving cell supports a plurality of numerologies, the base station configures the terminal to preferentially select one serving cell based on the serving cell priority. When one DRB corresponds to same priorities of a plurality of serving cells, a corresponding numerology is selected based on priorities of a plurality of numerology types for DRB communication. Alternatively, the base station configures the terminal to preferentially select one numerology based on the numerology priority. When one DRB corresponds to same priorities of a plurality of numerologies, a corresponding serving cell is selected based on priorities of a plurality of serving cells for DRB communication.

Optionally, the foregoing configuration information related to priorities includes the following content:

| | |
|---|---|
| drip-Identity | DRB-Identity, |
| logicalChannelIdentity | INTEGER (3..10) |
| sCellIndex1 | SCellIndex1, //serving cell ID |
| sCellIndex1-Priority1 | SCellIndex1 Priority1, |
| numerologyIndex1 | numerologyIndex1 //numerology ID |
| numerologyIndex1-Priority1 | numerologyIndex1-Priority1 |
| numerologyIndex2 | numerologyIndex2 //numerology ID |
| numerologyIndex2-Priority2 | numerologyIndex2-Priority2 |
| sCellIndex2 | SCellIndex2, //serving cell ID |
| sCellIndex1-Priority1 | SCellIndex1 Priority1, |

"sCellIndex1" and "sCellIndex2" are used to represent serving cell IDs, "sCellIndex1-priority" and "sCellIndex1-priority" are used to represent priorities of corresponding serving cells, "numerologyIndex1" and "numerologyIndex2" are used to represent numerology IDs, and "numerologyIndex1-Priority1" and "numerologyIndex2-Priority2" are used to represent priorities of corresponding numerologies.

Figure 4:
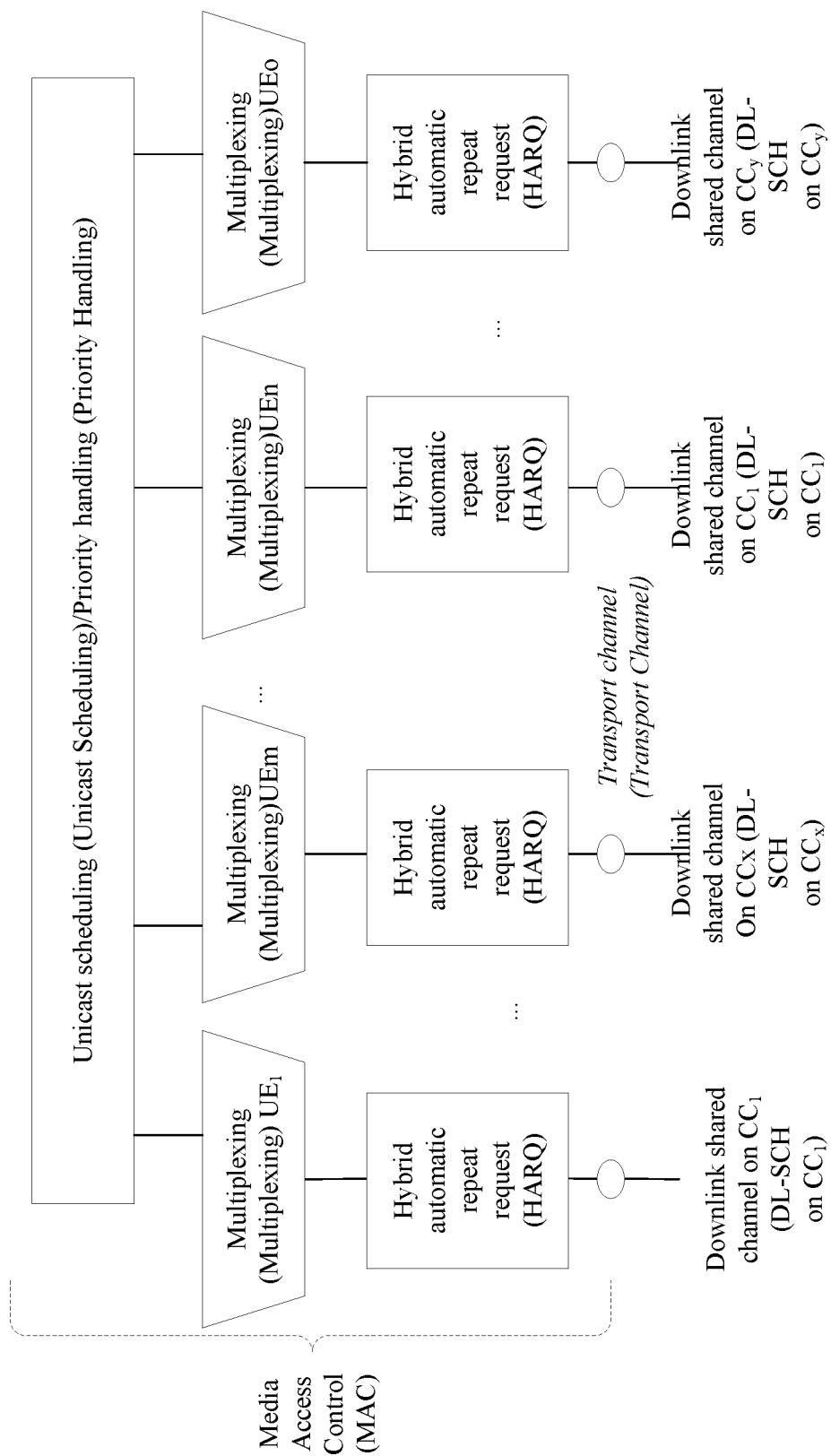
FIG. 4 is a schematic diagram of a protocol architecture proposed in an embodiment of the present invention.

Referring to FIG. 4, a downlink-based architecture in NR is provided.

S120. The base station sends the DRB configuration information to the terminal, so that the terminal performs, in a corresponding serving cell, communication of data carried on a DRB.

Optionally, the base station sends the DRB configuration information to one or more terminals by using RRC signaling or PDCCH signaling. In this embodiment, the base station sends the DRB configuration information by using the RRC signaling. In another embodiment, the base station may alternatively send the DRB configuration information in another manner. This is not limited in this embodiment of the present invention.

S130. The terminal receives the DRB configuration information and performs, based on the received DRB configuration information, communication in the serving cell corresponding to the DRB.

Specifically, the terminal selects, based on the DRB configuration information for determining the mapping relationship between serving cells and the DRBs used to carry different services, a corresponding serving cell to perform communication of data carried by one or more DRBs. However, data in a cache different from the data of the one or more DRBs may be transmitted by using an unselected serving cell or a serving cell with a lower priority in the DRB configuration information.

The DRB configuration information further includes at least one of serving cell priority information or numerology priority information.

For example, when the foregoing first configuration manner is used for carrier aggregation, that is, when each serving cell supports one numerology, the terminal selects one or more corresponding serving cells based on the serving cell priority included in the DRB configuration information, and transmits corresponding DRB data in the one or more selected serving cells.

For example, when the foregoing second configuration manner is used for carrier aggregation, that is, when each serving cell supports a plurality of numerologies, the terminal preferentially selects a serving cell based on the serving cell priority, and when one DRB corresponds to same priorities of a plurality of serving cells, selects a numerology based on priorities of the plurality of numerologies. Alternatively, the terminal preferentially selects a numerology based on the numerology priority, and when one DRB corresponds to same priorities of a plurality of numerologies, selects a plurality of corresponding serving cells based on the serving cell priority for communication.

S140. The terminal performs communication in a selected serving cell.

Figure 5:
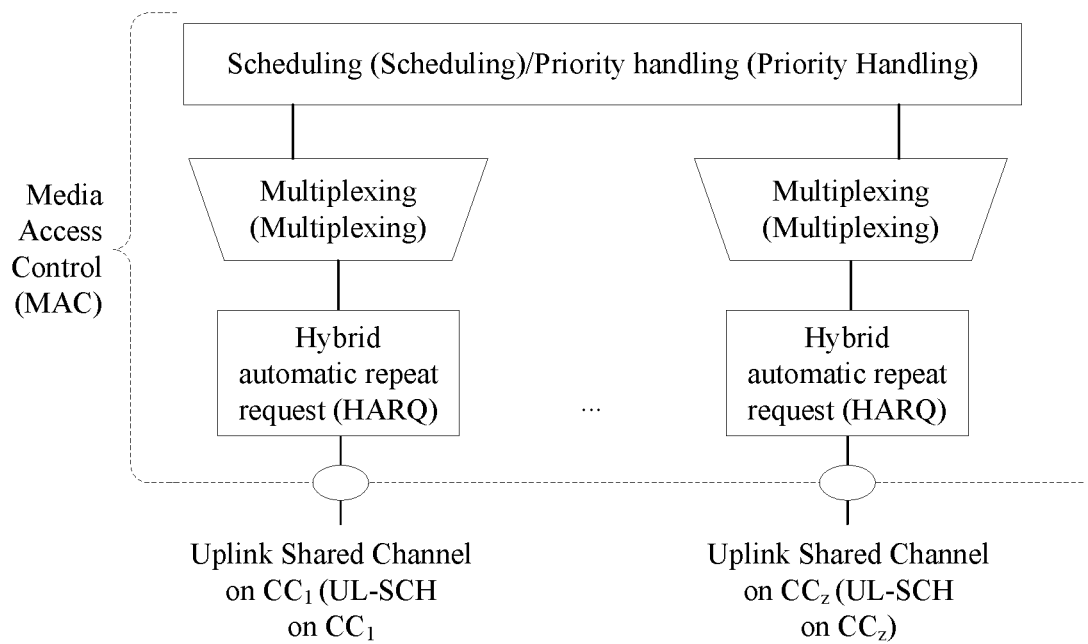
FIG. 5 is a schematic diagram of another protocol architecture proposed in an embodiment of the present invention.
Figure 6:
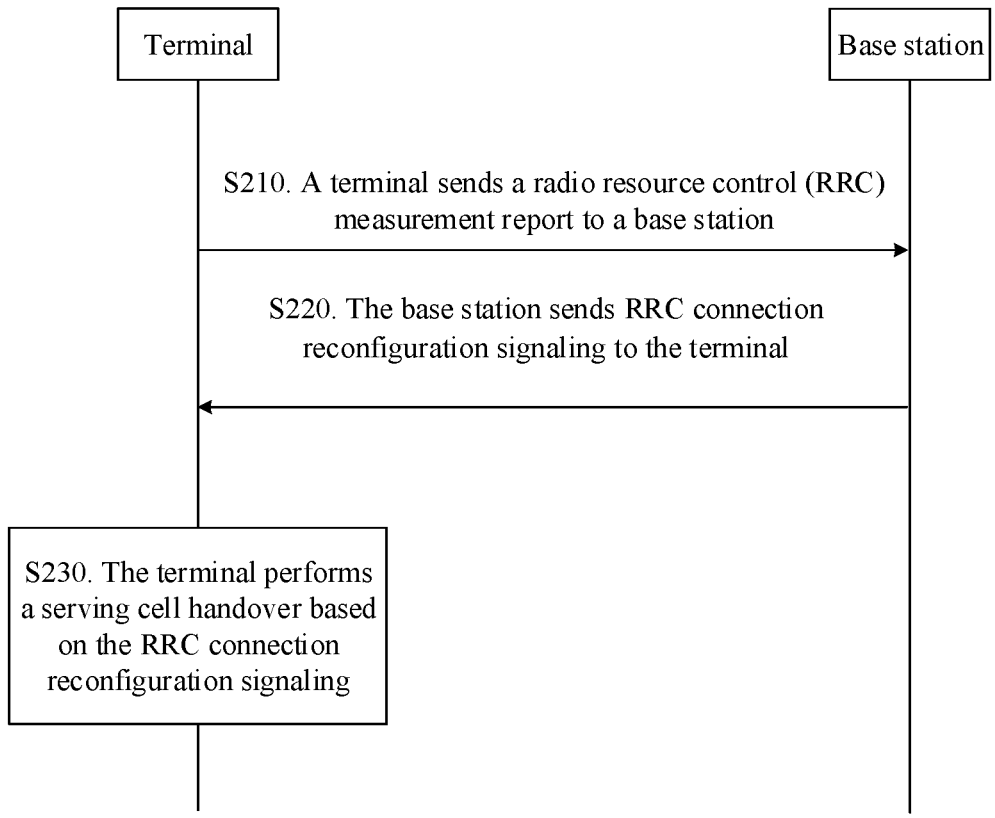
FIG. 6 is a schematic diagram of another communication method according to an embodiment of the present invention.

FIG. 5 shows an uplink-based architecture in NR.

In this embodiment of the present invention, a mapping relationship between a DRB and a serving cell, and/or between a DRB and a numerology is configured, so that the terminal preferentially performs data communication in a corresponding serving cell and on the numerology.

FIG. 5 shows a communication method according to another embodiment of the present invention. The communication method is performed by a base station and one or more terminals, so that the terminal can release a primary serving cell and keep data transmission of a secondary serving cell uninterrupted without data interruption. The terminal is connected to one primary serving cell and at least one secondary serving cell, and the primary serving cell uses a security key to encrypt data. As shown in FIG. 5, the communication method further includes:

S210. The terminal sends an RRC measurement report to the base station. The RRC measurement report may be used to report reference signal received power (RSRP) or reference signal received quality (RSRQ) of the following cells: a serving cell (a primary serving cell and a secondary serving cell), a cell in a list (namely, a cell indicated as a measurement object), and a cell detected at a listed frequency (which is not a cell in the list but a cell detected by UE). Specific reported content varies according to different types of communications systems. The RRC measurement report may be triggered when the terminal detects that one or more cells satisfy a predefined condition.

S220. The base station receives the RRC measurement report sent by the terminal, generates RRC connection reconfiguration signaling based on the RRC measurement report, and sends the RRC connection reconfiguration signaling to the terminal. The RRC connection reconfiguration signaling instructs the terminal to release data transmission with the primary serving cell and retain data transmission with the secondary serving cell. The RRC connection reconfiguration signaling includes any one or more of a secondary serving cell ID, a currently used security key, and DRB configuration information, so that the terminal uses the security key to continue communication in a secondary serving cell corresponding to the secondary serving cell ID. The secondary serving cell provides a service for the terminal as a new primary serving cell after a handover. Because the primary serving cell and the secondary serving cell are not the same, and numerologies used by both of them may not be the same, the RRC connection reconfiguration signaling sent by the base station to the terminal includes DRB configuration information of the secondary serving cell.

In a possible embodiment, the base station learns, according to the RRC measurement report, that signal quality of the primary serving cell becomes too poor to maintain communication with the terminal, but signal quality of the secondary serving cell is good enough to maintain communication with the terminal. The base station hands over communication between the base station and the terminal from the primary serving cell (e.g., Pcell) to the secondary serving cell (e.g., Scell). In this case, the base station performs S220 to generate the RRC connection reconfiguration signaling.

S230. The terminal receives the RRC connection reconfiguration signaling, releases a primary serving cell based on the RRC connection reconfiguration signaling, and keeps service transmission with a secondary serving cell. Because the secondary serving cell already includes system configuration information required for establishing a connection, the terminal releases a communication connection to the primary serving cell based on the RRC connection reconfiguration signaling, and keeps data communication in a secondary serving cell indicated by the secondary serving cell ID included in the RRC connection reconfiguration signaling uninterrupted, to continue a service from the secondary serving cell.

Figure 7:
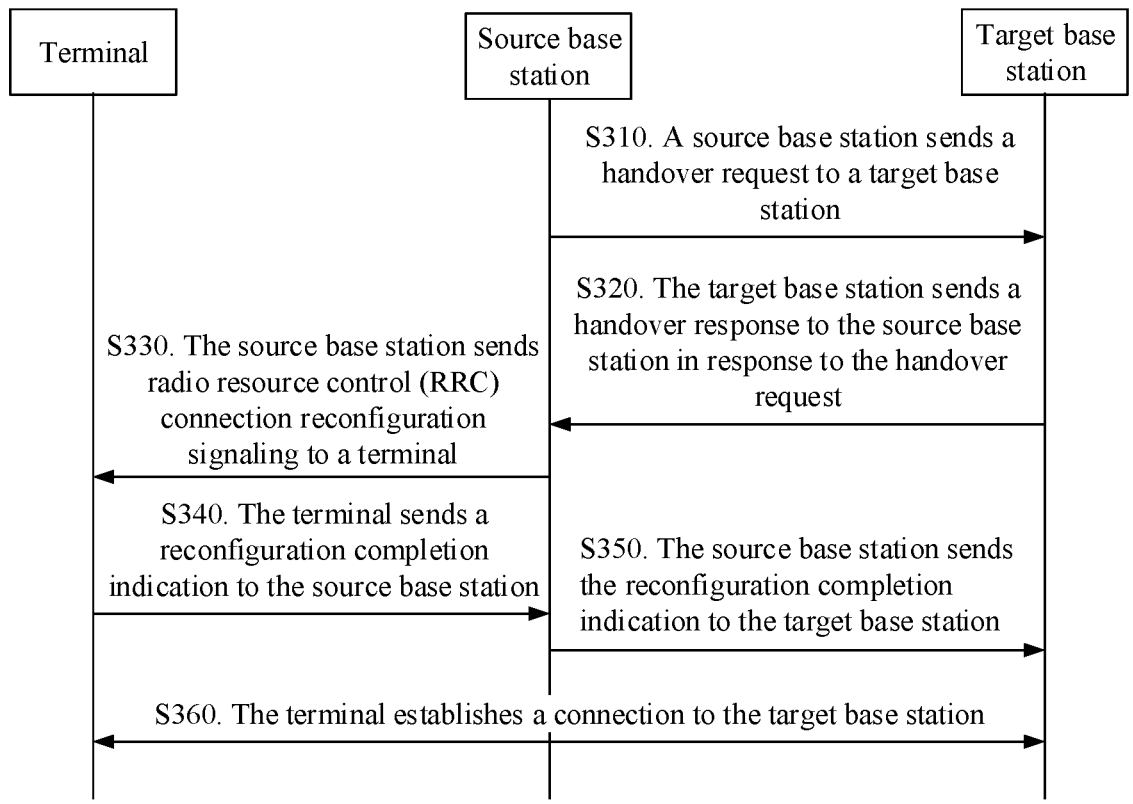
FIG. 7 is a schematic diagram of still another communication method according to an embodiment of the present invention.

FIG. 7 shows a communication method according to still another embodiment of the present invention. The communication method is performed by a source base station, a target base station, and one or more terminals, so that the terminal can hand over a part or all of data communication from the source base station to the target base station without data interruption. As shown in FIG. 7, the communication method further includes:

S310. The source base station sends a handover request to the target base station, where the handover request includes DRB configuration information of a primary serving cell and a secondary serving cell in the source base station. The DRB configuration information is used to determine, when a target base station performs a handover for the terminal, a target base station to which the DRB configuration information is to be delivered. In an embodiment, DRB configuration information of the target base station is the same as that of the source base station. In another embodiment, the target base station may make modification based on the DRB configuration information of the source base station to define the DRB configuration information of the target base station.

Optionally, the handover request further includes a retaining indication, and the retaining indication is used to instruct the target base station that the terminal retains a connection to a serving cell provided by the source base station.

S320. The target base station receives the handover request from the source base station, and sends a handover response to the target base station in response to the handover request of the source base station.

Optionally, the handover response includes the DRB configuration information of the target base station. To be specific, the target base station sends its own DRB configuration information to the source base station by using the handover response.

Optionally, based on connection retaining information in the handover request, the target base station includes the retaining indication in the handover response.

S330. The source base station receives the handover response from the target base station, and sends RRC connection reconfiguration signaling to the terminal. It should be noted that, FIG. 7 merely shows one terminal. When a plurality of terminals exist, a manner in which the plurality of terminals perform a handover is similar to a manner in which the terminal performs a handover. Details are not described herein again.

Optionally, when the handover response includes the retaining indication, the source base station adds the retaining indication to the RRC connection reconfiguration signaling sent to the terminal, so that the terminal retains connections to some or all of serving cells in the source base station after a handover.

Optionally, when the handover response includes the DRB configuration information of the target base station, the source base station sends the DRB configuration information of the target base station to the terminal by using the RRC connection reconfiguration signaling. In this case, the source base station uses a transparent transmission manner.

Optionally, when the handover response includes the DRB configuration information of the target base station, the source base station notifies the terminal, by using the RRC connection reconfiguration signaling, of DRB configuration information of a part or all of serving cells retained after a handover.

S340. The terminal receives the RRC connection reconfiguration signaling from the source base station, performs reconfiguration based on the RRC connection reconfiguration signaling, and sends a reconfiguration completion indication to the source base station after the reconfiguration is completed.

Optionally, when the RRC connection reconfiguration signaling includes the retaining indication, the terminal retains a currently connected secondary serving cell, and at the same time, establishes a connection to a serving cell of the target base station and sets the serving cell as a primary serving cell. In this case, a random access process does not need to be performed for a retained secondary serving cell, but the random access process needs to be performed for a newly connected primary serving cell. In addition, to ensure communication with the secondary serving cell of the source base station, the terminal uses a same key as that of an original serving cell for communication. To ensure communication with the primary serving cell of the target base station, the terminal further uses a key of the primary serving cell of the target base station for communication.

Optionally, when the RRC connection reconfiguration signaling does not include the retaining indication, the terminal releases a currently connected secondary serving cell, and at the same time, establishes a connection to a serving cell of the target base station and sets the serving cell as a primary serving cell. In this case, the terminal needs to use an random access process to establish a connection to the new primary serving cell, and uses a key of the new primary serving cell for communication.

Optionally, because a serving cell providing a service to the terminal before a handover is different from a serving cell providing a service to the terminal after the handover, the RRC connection reconfiguration signaling further includes updated DRB configuration information, so that the terminal performs communication of one or more DRBs in one or more corresponding serving cells based on the updated DRB configuration information. For specific details of the DRB configuration information, refer to the description of the DRB configuration information in FIG. 3.

S350. The source base station receives the reconfiguration completion indication from the terminal, and sends the reconfiguration completion indication to the target base station.

Optionally, the UE directly sends the reconfiguration completion indication to the target base station without transparent transmission through the source base station.

S360. The target base station establishes a connection to the terminal.

In another embodiment, to support the foregoing two carrier configuration manners, Discontinuous Reception (DRX) configuration information is further proposed. The DRX configuration information is configured by the base station. Optionally, in the foregoing first configuration manner of a serving cell, the base station configures a separate DRX-related parameter for each serving cell. Optionally, in the foregoing second configuration manner of a serving cell, the base station configures a separate DRX-related parameter for each numerology of each serving cell.

Specifically, the DRX-related parameter includes:

```
DRX-Config-r13 ::=              SEQUENCE {
sCellIndex                      SCellIndex,              //serving cell ID
numerologyIndex                 numerologyIndex          //numerology ID
//The following content is existing LTE DRX parameters:
onDurationTimer-v1310           ENUMERATED      {psf300, psf400, psf500, psf600,
                                                psf800, psf1000, psf1200, psf1600}
                                                OPTIONAL, --Need OR
drx-RetransmissionTimer-v1310   ENUMERATED      {psf40, psf64, psf80, psf96, psf112,
                                                psf128, psf160, psf320}
                                                OPTIONAL, --Need OR
drx-ULRetransmissionTimer-r13   ENUMERATED      {psf0, psf1, psf2, psf4, psf6, psf8, psf16,
                                                psf24, psf33, psf40, psf64, psf80,
                                                psf96, psf112, psf128, psf160, psf320}
}
```

DRX configuration parameters allow the terminal to separately detect different serving cells and numerologies. To be specific, in NR, when the UE is in a "DRX on" state in a serving cell or numerology, the UE is in a "DRX off" state in another serving cell or numerology. Alternatively, in a same serving cell, when the terminal is in a "DRX on" state in a numerology, the terminal is in a "DRX off" state in another numerology. For the foregoing existing LTE DRX parameters, refer to related specifications in an existing LTE protocol.

In still another embodiment, to support the foregoing two configuration manners of a serving cell, hybrid automatic repeat request (HARQ) configuration information is further proposed. When a same serving cell supports a plurality of numerologies, a HARQ parameter is set for each numerology of the serving cell.

```
sCellIndex              SCellIndex,
numerologyIndex         numerologyIndex
//The following content is existing LTE HARQ parameters.
maxHARQ-Tx              ENUMERATED {n1, n2, n3, n4, n5, n6, n7, n8,
                                   n10, n12, n16, n20, n24, n28,
```

In this HARQ configuration manner, the UE separately performs HARQ transmission on a plurality of numerologies of the serving cell, and HARQ data retransmission is also performed in the serving cell or on the numerology. For the foregoing existing LTE HARQ parameters, refer to related specifications in the existing LTE protocol.

In yet another embodiment, to support the foregoing two carrier configuration manners, a scheduling request (SR) configuration parameter, a buffer status report (BSR) configuration parameter, and a Power Headroom Report (PHR) configuration parameter are further proposed.

Optionally, when the first configuration manner is used for a carrier, the base station configures, by using the SR configuration parameter, SR signaling generated by the terminal to be transmitted only at a specific carrier or preferentially transmitted at a specific carrier. The base station configures, by using the BSR configuration parameter, BSR signaling generated by the terminal to be transmitted only at a specific carrier or preferentially transmitted at a specific carrier. The base station configures, by using the PHR configuration parameter, PHR signaling generated by the terminal to be transmitted only at a specific carrier or preferentially transmitted at a specific carrier.

Optionally, when the second configuration manner is used for a carrier, the base station configures, by using the SR configuration parameter, SR signaling generated by the terminal to be transmitted only on a numerology at a carrier or preferentially transmitted on a specific numerology. The base station configures, by using the BSR configuration parameter, BSR signaling generated by the terminal to be transmitted only on a numerology at a carrier or preferentially transmitted on a specific numerology. The base station configures, by using the PHR configuration parameter, PHR signaling generated by the terminal to be transmitted only on a numerology at a carrier or preferentially transmitted on a specific numerology.

For each SR/BSR/PHR transmission, the following relationship is defined for the signaling:

```
sCellIndex              SCellIndex,              //serving cell ID
numerologyIndex         numerologyIndex          //numerology ID
//The following are existing LTE parameters.
BSR-Config              BSR-Config
phr-Config              phr-Config
SR-Config               SR-Config
```

For the existing LTE parameters, refer to related specifications in the existing LTE protocol. According to the foregoing configuration parameters, the SR signaling, the PHR signaling, and the BSR signaling generated by the terminal are transmitted only in a specified SCellIndex or on a numerology (numerologyIndex). This configuration manner allows, for example, the URLLC service to be transmitted on a numerology supporting the URLLC service, thereby ensuring a low-latency and high-reliability requirement of the service.

In another embodiment, the base station uses the RRC connection reconfiguration signaling to notify the UE that generated signaling is preferentially mapped to a carrier or a numerology for transmission. The generated signaling may be the HARQ signaling, SR signaling, BSR signaling, and PHR signaling mentioned above. For example, when the first configuration manner is used for the carrier, the terminal preferentially transmits corresponding Media Access Control MAC layer signaling based on a serving cell priority. As long as the terminal has a UL resource in the cell, the terminal first transmits the MAC layer signaling in the cell; if there is no UL resource, the terminal transmits the MAC layer signaling in a cell with a second highest priority. When the second configuration manner is used for the carrier, the terminal transmits corresponding signaling preferentially based on a cell priority and then based on a numerology priority. Alternatively, the terminal transmits corresponding DRB data preferentially based on the numerology priority regardless of the cell priority.

The foregoing mainly describes the solutions in the embodiments of the present invention from a perspective of interaction between network elements. It may be understood that, in order to implement the foregoing functions, the network elements such as the UE, the base station, and a core network entity include a corresponding hardware structure and/or software module for performing the functions. A person of ordinary skill in the art should easily be aware that, in combination with the examples described in the embodiments disclosed in this specification, units, algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 8:
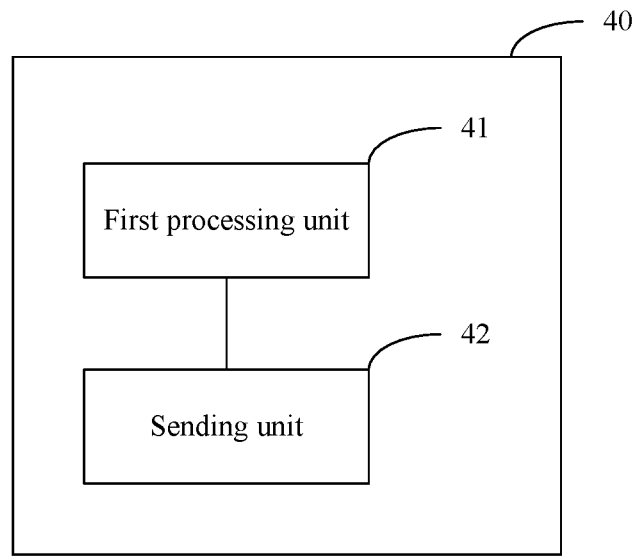
FIG. 8 is a schematic diagram of modules of a base station according to an embodiment of the present invention.

FIG. 8 is a possible schematic diagram of modules of a base station 40 in the foregoing embodiments. As shown in FIG. 8, the base station 40 includes a first processing unit 41 and a sending unit 42.

The first processing unit 41 is configured to obtain DRB configuration information, where the DRB configuration information is used to determine a mapping relationship between serving cells and DRB used to carry data of different service types.

The sending unit 42 is configured to send the DRB configuration information to a terminal, so that the terminal communicates with the base station in a serving cell corresponding to a DRB.

The first processing unit 41 and the sending unit 42 are further configured to perform a processing process of the base station in the embodiments shown in FIG. 3 to FIG. 7, and/or are configured to perform other processes of technologies described in this application.

Figure 9:
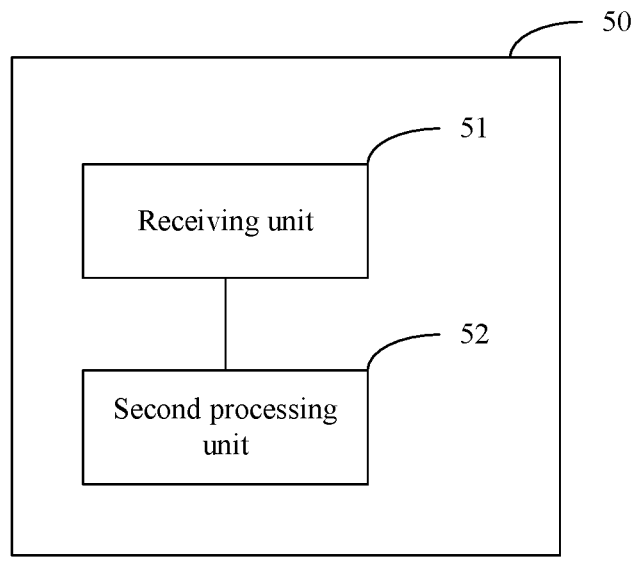
FIG. 9 is a schematic diagram of modules of a terminal according to an embodiment of the present invention.

FIG. 9 is a possible schematic diagram of modules of a terminal 50 in the foregoing embodiments. As shown in FIG. 9, the terminal 50 includes a receiving unit 51 and a second processing unit 52.

The receiving unit 51 is configured to receive DRB configuration information from a base station, and the DRB configuration information is used to determine a mapping relationship between serving cells and DRBs used to carry data of different service types.

The second processing unit 52 is configured to control the terminal to communicate with the base station in a serving cell corresponding to a DRB in response to the DRB configuration information.

The receiving unit 51 and the processing unit 52 are further configured to perform a processing process of the terminal in the embodiments of FIG. 3 to FIG. 7, and/or are configured to perform other processes of technologies described in this application.

Figure 10:
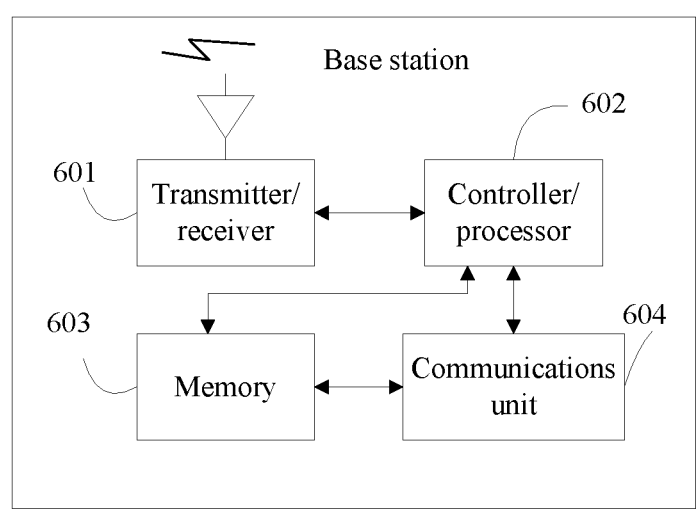
FIG. 10 is a possible design diagram of a base station according to an embodiment of the present invention.

FIG. 10 is a possible schematic structural diagram of a base station 60 in the foregoing embodiments.

The base station includes a transmitter/receiver 601, a controller/processor 602, a memory 603, and a communications unit 604. The transmitter/receiver 601 is configured to support information sending and receiving between the base station and the terminal in the foregoing embodiment, and support wireless communication between the terminal and another terminal. The controller/processor 602 performs various functions used for communication with the terminal. On an uplink, an uplink signal from the terminal is received through an antenna and demodulated by the receiver 601, and further, the controller/processor 602 performs processing to restore service data and signaling information that are sent by the UE. On a downlink, the controller/processor 602 processes the service data and the signaling message, the transmitter 601 performs demodulation to generate a downlink signal, and the downlink signal is sent to the UE through the antenna. The controller/processor 602 further performs processing processes of the base station in FIG. 3 to FIG. 7, and/or is configured to perform other processes of technologies described in this application. The memory 603 is configured to store program code and data of the base station. The communications unit 604 is configured to support communication between the base station and another network entity, for example, configured to support communication between the base station and the target base station shown in FIG. 7.

It may be understood that, FIG. 10 merely shows a simplified design of the base station. In actual application, the base station may include any quantities of transmitters, receivers, processors, controllers, memories, communications units, and the like. All base stations that can implement the embodiments of the present invention fall within the protection scope of the present invention.

Figure 11:
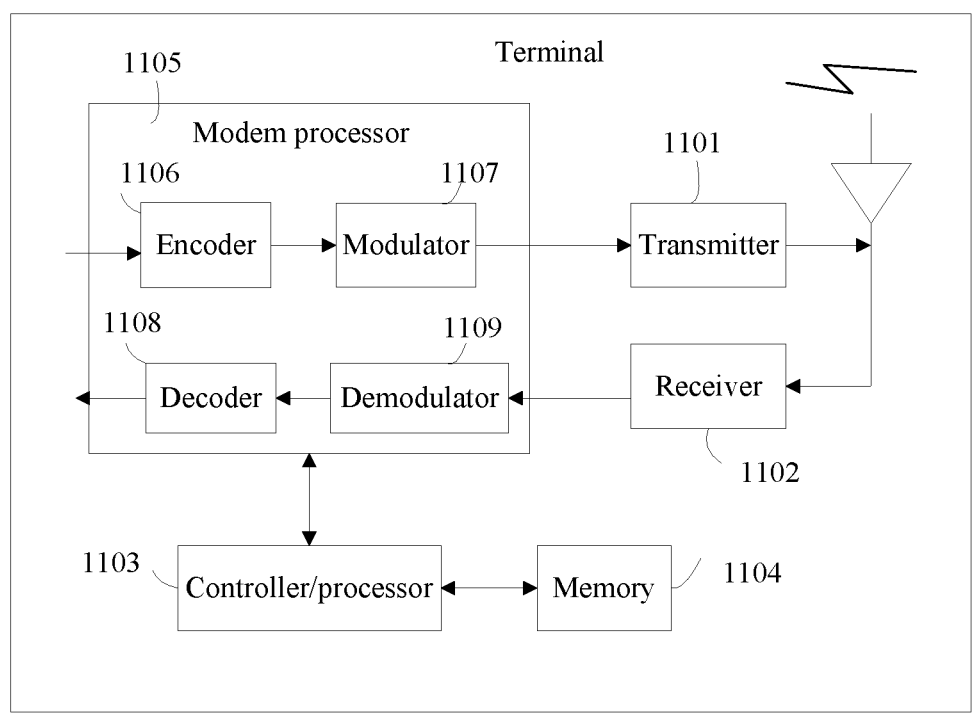
FIG. 11 is a possible design diagram of a terminal according to an embodiment of the present invention.

FIG. 11 is a simplified schematic diagram of a possible design structure of a terminal in the foregoing embodiments. The terminal includes a transmitter 1101, a receiver 1102, a controller/processor 1103, a memory 1104, and a modem processor 1105.

The transmitter 1101 adjusts (for example, performs analog conversion, filtering, amplification, and up-conversion on) an output sample and generates an uplink signal, and the uplink signal is transmitted to the base station in the foregoing embodiments through an antenna. On a downlink, the antenna receives a downlink signal transmitted by the base station in the foregoing embodiments. The receiver 1102 adjusts (for example, performs filtering, down-conversion, and digitalization on) a signal received from the antenna, and provides an input sample. In the modem processor 1105, the encoder 1106 receives service data and a signaling message that are to be sent on an uplink, and processes (for example, performs formatting, encoding, or interleaving on) the service data and the signaling message. A modulator 1107 further processes (for example, performs symbol mapping or modulation on) encoded service data and an encoded signaling message, and provides an output sample. A demodulator 1109 processes (for example, demodulates) the input sample and provides symbol estimation. The decoder 1108 performs processing (for example, de-interleaving and decoding) on the symbol estimation, and provides decoded data and a decoded signaling message that are sent to the UE. The encoder 1106, the modulator 1107, the demodulator 1109, and the decoder 1108 may be implemented by the combined modem processor 1105. These units perform processing according to radio access technologies (for example, access technologies of an LTE system and another evolved system) used by a radio access network.

The controller/processor 1103 performs control and management on an action of the terminal, and is configured to perform the processing performed by the terminal in the foregoing embodiments, for example, is configured to control the terminal to perform communication based on DRB configuration information. In an example, the controller/processor 1103 is configured to support the terminal in performing the operations of the terminal in FIG. 3 to FIG. 7.

The controller/processor 1103 configured to perform functions of the base station, the terminal, or a core network apparatus in the present invention may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor 1103 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

Method or algorithm steps described with reference to the content disclosed in the present invention may be implemented by hardware, or may be implemented by the processor by executing a software instruction. The software instruction may include a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium and write information to the storage medium. Certainly, the storage medium may be a component of the processor. The processor and the storage medium may be located in the ASIC. In addition, the ASIC may be located in user equipment. Certainly, the processor and the storage medium may alternatively exist in the user equipment as discrete components.

A person skilled in the art should be aware that in the foregoing one or more examples, functions described in the present invention may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on technical solutions of the embodiments of the present invention shall fall within the protection scope of the present invention.

What is claimed is:

1. A communication method comprising:
    obtaining, by a base station, data radio bearer (DRB) configuration information,
        wherein the DRB configuration information is used to determine a mapping relationship between serving cells and DRBs used to carry data of different service types,
        wherein a DRB is associated with one or more serving cells and each serving cell supports one or more numerologies,
        wherein the DRB configuration information contains a mapping relationship between a DRB and the one or more numerologies supported by each serving cell, and
        wherein each of the one or more numerologies is associated with a subcarrier spacing; and
    sending, by the base station, the DRB configuration information to a terminal for enabling the terminal to communicate with the base station in one or more serving cells by using one or more numerologies associated with one or more DRBs carrying data of the terminal.

2. The communication method according to claim 1, wherein the mapping relationship between a DRB and the one or more numerologies supported by each serving cell comprises an identity of the DRB, and information for indicating the one or more numerologies supported by the each serving cell.

3. The communication method according to claim 1, wherein the information for indicating the one or more numerologies supported by the each serving cell comprises a serving cell index and the information for indicating the one or more numerologies supported by the serving cell.

4. The communication method according to claim 1, wherein the DRB configuration information further contains a logical channel identity.

5. The communication method according to claim 1, wherein the terminal is connected to a primary serving cell and at least one secondary serving cell, and the communication method further comprises:
    sending radio resource control (RRC) connection reconfiguration signaling to the terminal, wherein the RRC connection reconfiguration signaling comprises a secondary serving cell index and the DRB configuration information, so that the terminal performs communication in a secondary serving cell identified by the secondary serving cell index.

6. The communication method according to claim 1, wherein the communication method further comprises:
    sending a handover request to another base station;
    receiving a handover response from the another base station, wherein the handover response comprises DRB configuration information of the another base station and one or more serving cell indexes of the another base station; and
    sending radio resource control (RRC) connection reconfiguration signaling to the terminal in response to the handover response,
        wherein the RRC connection reconfiguration signaling comprises the DRB configuration information and the one or more serving cell indexes of the another base station, so that the terminal performs communication based on the RRC connection reconfiguration signaling in a serving cell associated with the one or more serving cell indexes of the another base station.

7. A communication method comprising:
receiving, by a terminal, data radio bearer (DRB) configuration information from a base station,
wherein the DRB configuration information is used to determine a mapping relationship between serving cells and DRBs used to carry data of different service types,
wherein a DRB is associated with one or more serving cells and each serving cell supports one or more numerologies,
wherein the DRB configuration information contains a mapping relationship between a DRB and the one or more numerologies supported by each serving cell, and
wherein each of the one or more numerologies is associated with a subcarrier spacing; and
communicating with the base station in one or more serving cells by using one or more numerologies associated with one or more DRBs carrying data in response to the DRB configuration information.

8. The communication method according to claim 7, wherein the mapping relationship between a DRB and the one or more numerologies supported by each serving cell comprises an identity of the DRB, and information for indicating the one or more numerologies supported by the each serving cell.

9. The communication method according to claim 7, wherein the DRB configuration information further contains a logical channel identity.

10. The communication method according to claim 7, wherein the terminal is connected to a primary serving cell and at least one secondary serving cell, and the communication method further comprises:
receiving, by the terminal, radio resource control (RRC) connection reconfiguration signaling from the base station, wherein the RRC connection reconfiguration signaling comprises a secondary serving cell index and the DRB configuration information; and
performing communication in a secondary serving cell associated with the secondary serving cell index in response to the RRC connection reconfiguration signaling.

11. The communication method according to claim 7, wherein the method further comprises:
receiving, by the terminal, radio resource control (RRC) connection reconfiguration signaling from the base station,
wherein the RRC connection reconfiguration signaling comprises DRB configuration information and one or more serving cell indexes of another base station, so that the terminal performs communication based on the RRC connection reconfiguration signaling in a serving cell associated with the one or more serving cell indexes of the another base station.

12. A communication apparatus comprising:
at least one processor coupled to a memory and a transceiver, wherein the at least one processor is instructed by programming instructions stored in the memory to perform at least the following operations:
obtaining data radio bearer (DRB) configuration information,
wherein the DRB configuration information is used to determine a mapping relationship between serving cells and DRBs used to carry data of different service types,
wherein a DRB is associated with one or more serving cells and each serving cell supports one or more numerologies,
wherein the DRB configuration information contains a mapping relationship between a DRB and the one or more numerologies supported by each serving cell, and
each of the one or more numerologies is associated with a subcarrier spacing; and
sending the DRB configuration information to a terminal for enabling the terminal to communicate with the base station in one or more serving cells by using one or more numerologies associated with one or more DRBs carrying data of the terminal.

13. The communication apparatus according to claim 12, wherein the mapping relationship between a DRB and the one or more numerologies supported by each serving cell comprises an identity of the DRB, and information for indicating the one or more numerologies supported by the each serving cell.

14. The communication apparatus according to claim 12, wherein the DRB configuration information further contains a logical channel identity.

15. The communication apparatus according to claim 12, wherein the terminal is connected to a primary serving cell and at least one secondary serving cell, and the operations further comprises:
sending radio resource control (RRC) connection reconfiguration signaling to the terminal, wherein the RRC connection reconfiguration signaling comprises a secondary serving cell index and the DRB configuration information, so that the terminal performs communication in a secondary serving cell identified by the secondary serving cell index.

16. The communication apparatus according to claim 12, wherein the operations further comprises:
sending a handover request to another base station;
receiving a handover response from the another base station, wherein the handover response comprises DRB configuration information of the another base station and one or more serving cell indexes of the another base station; and
sending radio resource control (RRC) connection reconfiguration signaling to the terminal in response to the handover response,
wherein the RRC connection reconfiguration signaling comprises the DRB configuration information and the one or more serving cell indexes of the another base station, so that the terminal performs communication based on the RRC connection reconfiguration signaling in a serving cell associated with the one or more serving cell indexes of the another base station.

17. A communication apparatus comprises:
at least one processor coupled to a memory and a transceiver, wherein the at least one processor is instructed by programming instructions stored in the memory to perform at least the following operations:
receiving data radio bearer (DRB) configuration information from a base station, wherein the DRB configuration information is used to determine a mapping relationship between serving cells and DRBs used to carry data of different service types, wherein a DRB is associated with one or more serving cells and each serving cell supports one or more numerologies, wherein the DRB configuration information contains a mapping relationship between a DRB and the one or more numerologies supported by each serving cell, and wherein each of the one or more numerologies is associated with a subcarrier spacing; and controlling the terminal to communicate with the base station in one or more serving cells by using one or more numerologies associated with one or more DRBs carrying data in response to the DRB configuration information.

18. The communication apparatus according to claim 17, wherein the mapping relationship between a DRB and the one or more numerologies supported by each serving cell comprises an identity of the DRB, and information for indicating the one or more numerologies supported by the each serving cell.

19. The communication apparatus according to claim 17, wherein the DRB configuration information further contains a logical channel identity.

20. The communication apparatus according to claim 17, wherein the communication apparatus is connected to a primary serving cell and at least one secondary serving cell, and the operations further comprise:

receiving radio resource control (RRC) connection reconfiguration signaling from the base station, wherein the RRC connection reconfiguration signaling comprises a secondary serving cell index and the DRB configuration information; and performing communication in a secondary serving cell associated with the secondary serving cell index in response to the RRC connection reconfiguration signaling.

21. The communication apparatus according to claim 17, wherein the operations further comprise:

receiving radio resource control (RRC) connection reconfiguration signaling from the base station, wherein the RRC connection reconfiguration signaling comprises DRB configuration information and one or more serving cell indexes of another base station, so that the terminal performs communication based on the RRC connection reconfiguration signaling in a serving cell associated with the one or more serving cell indexes of the another base station.

* * * * *